Jan. 17, 1967 E. F. SMALL 3,298,629

FISHING REEL

Filed May 27, 1964 2 Sheets-Sheet 1

INVENTOR.

Edward F. Small

BY

Roberts, Cushman & Grover

ATT'YS

Jan. 17, 1967 E. F. SMALL 3,298,629

FISHING REEL

Filed May 27, 1964 2 Sheets-Sheet 2

United States Patent Office 3,298,629 Patented Jan. 17, 1967

3,298,629
FISHING REEL
Edward F. Small, 188 Bay Shore Road, Hyannis, Mass. 02601
Filed May 27, 1964, Ser. No. 370,528
9 Claims. (Cl. 242—84.2)

This invention relates to fishing reels and especially to open-face reels.

The principal objects of the invention are to provide a reel in which the line can be released at the instant of casting so as to flow freely off the end of the spool without having to travel a devious course through, under and around component parts of the reel; to provide a reel in which the line can be released without having to pick it up or disengage it from the flyer or other retrieving component of the reel; to provide a reel in which rotation of the handle for retrieving is all that is necessary to restore the flyer to its operative position for automatically picking up the line and winding it on the spool; to provide a reel in which the spool can be easily removed and replaced without threading the line through, under and about component parts of the reel; and to provide a reel which is extremely simple in construction and yet is compact, efficient, trouble free and durable.

As herein illustrated, the reel comprises a spool supported on a spindle with its axis disposed in the direction of casting to enable flow of the line over its forward end. In one form of the invention, there are means situated at opposite ends of the spool cooperable, by rotation of one of the means relative to the spool, to wind and retain the line on the spool, and by separation to permit the line to flow from the forward end of the spool, and other means operative, as the cast is made, to effect such separation. The latter means is in the form of a thumb operable lever operative, as the backswing is made, to precondition the means at the ends of the spool for separation, and further operative, as the forward swing is made, to effect such separation. The means at the ends of the spool in one form of the invention comprise a receptacle at the forward end and a flyer at the rear end. The flyer is rotatable relative to the axis of the spool and is operative in conjunction with the receptacle, which is concentric with the front end of the spool and has a part extending rearwardly over the front end, to wind and retain the line on the spool without pinching the line between fixed parts. The receptacle is free to rotate and is rotated by frictional engagement of the flyer therewith. The spool, receptacle and flyer are supported on the spindle and the latter is movable rearwardly on its support. There is means on the support in the form of a latch at the rearward position of the spindle operative to retain the flyer in the rearward position, and means operative, when the spindle is released, to move it, the spool and the receptacle forwardly relative to the flyer thus exposing the spool. Rearward movement of the spindle is effected by depression of the lever and forward movement of the spindle is effected by spring means when the lever is released. In an alternate form, the receptacle is omitted and the front end flange of the spool enlarged and provided with a peripheral, rearwardly extending part concentric with the flyer and cooperable therewith to wind the line on the spool and retain it thereon. In this latter form of the invention, since the spool is non-rotating, the rearwardly extending part at the periphery of the forward end flange is non-rotating. The flyer is supported on the spindle by a sleeve, there is means for effecting rotation of the sleeve and hence the flyer, and other means operative, by such rotation, to disengage the latch so that, at the instant of retrieving by rewinding, the flyer is permitted to move forwardly so as automatically to pick up the line for rewinding.

The invention will now be described in greater detail with reference to the accompanying drawings wherein.

Figure 1:
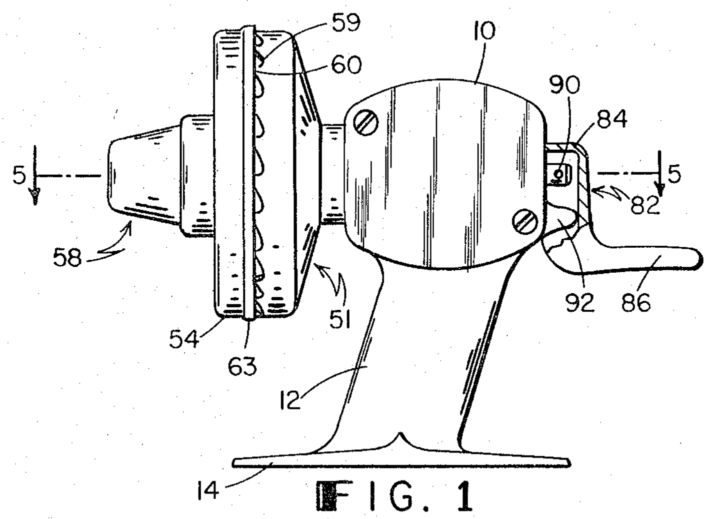
FIG. 1 is a side elevation of the reel with a portion at the rear end broken away in part and showing the position of the component parts when the line is wound on the spool and prior to casting.

Referring to the drawings, the reel has a hollow body part 10 provided with a leg 12 at the lower end of which is a flange 14 by means of which it may be attached to a rod in conventional fashion. At one side of the body portion, substantially at right angles to the leg 12, there is a bearing projection 16 containing a bearing opening 18 within which is rotatably mounted a shaft 20 with its inner end projecting into the body and its outer end projecting from the bearing 16. A handle 22 is non-rotatably mounted on the outer end of the shaft 20 and secured thereto by a threaded screw 24. The inner end of the shaft 20 has on it a bearing hub 26 which, in cooperation with the screw 24, prevents endwise movement of the shaft in its bearing and provides support for an annular gear 28 which is secured thereto and is rotatable by rotation of the handle 22. The body 10 has at one end an opening 30, the axis of which is at right angles to the bearing opening 18, and a sleeve 32 is mounted in this opening for rotation about its longitudinal axis and for sliding movement along its axis. The sleeve has on its peripheral surface elongate teeth 34 which are engaged with the teeth of the gear 28 which, because of their length, remain in engagement with the gear regardless of the axial position of the sleeve. A spindle 36 is slidably mounted in the sleeve 32 and has a reduced portion 38 extending forwardly from the sleeve and a reduced portion 40 extending rearwardly from the sleeve. A spool 42, comprising a barrel 44 and spaced parallel flanges 46 and 48, is non-rotatably mounted on the spindle portion 38 as will appear hereinafter. A receptacle 50 having a circular end wall 52 and an annular flange 54 is also mounted on the spindle portion 38 at the forward end of the spool, so that the end wall 52 is parallel to the flange 46 and the flange 54 is concentric with the peripheral edge of the flange 46 and extends rearwardly over the forward end of the spool so as to partially enclose the spool. The receptacle 50, in the form of the invention shown in FIGS. 1 to 5, is rotatably supported by a cap nut assembly 58 which holds it and the spool on the spindle portion 38. The cap nut assembly comprises a nut 60, a bearing sleeve 68 and a coiled spring 66. The cap nut is internally threaded for threaded engagement with threads 62 on the forward end of the spindle portion 38 and has on it a radial flange 64. The bearing sleeve has intermediate its ends a radial flange 70, at the outer edge of which is an annular, forwardly extending part 76. The bearing sleeve is mounted on the spindle part 38 and is held with its rear end bearing against the forward end of the spool by the spring 66 which is placed about the spindle portion 38 forwardly of the flange 70 and held under compression with its ends bearing, respectively, against the flange 70 and the part 64 of the nut 60 by the nut. The receptacle 50 is rotatably mounted on the bearing sleeve 68 rearwardly of the flange 70 and is held thereon by a washer 74 mounted in a peripheral groove 71 formed in the sleeve. The receptacle 50 is thus free to rotate relative to the bearing sleeve and is rotated by frictional engagement of the flyer therewith as will appear hereinafter. The cap nut assembly holds the spool nonrotatable on the spindle portion 38 by forcing it rearwardly into frictional engagement with a friction disc 73 mounted on the spindle portion 38 between the rear end of the spool and a shoulder 75 on the spindle portion 38. A hollow cap 77, comprising a molding formed to the nut 60, forms an enclosure for the spring 66 and is provided with a flange 78 which fits into the forwardly extending part 76 on the bearing sleeve.

Figure 5:
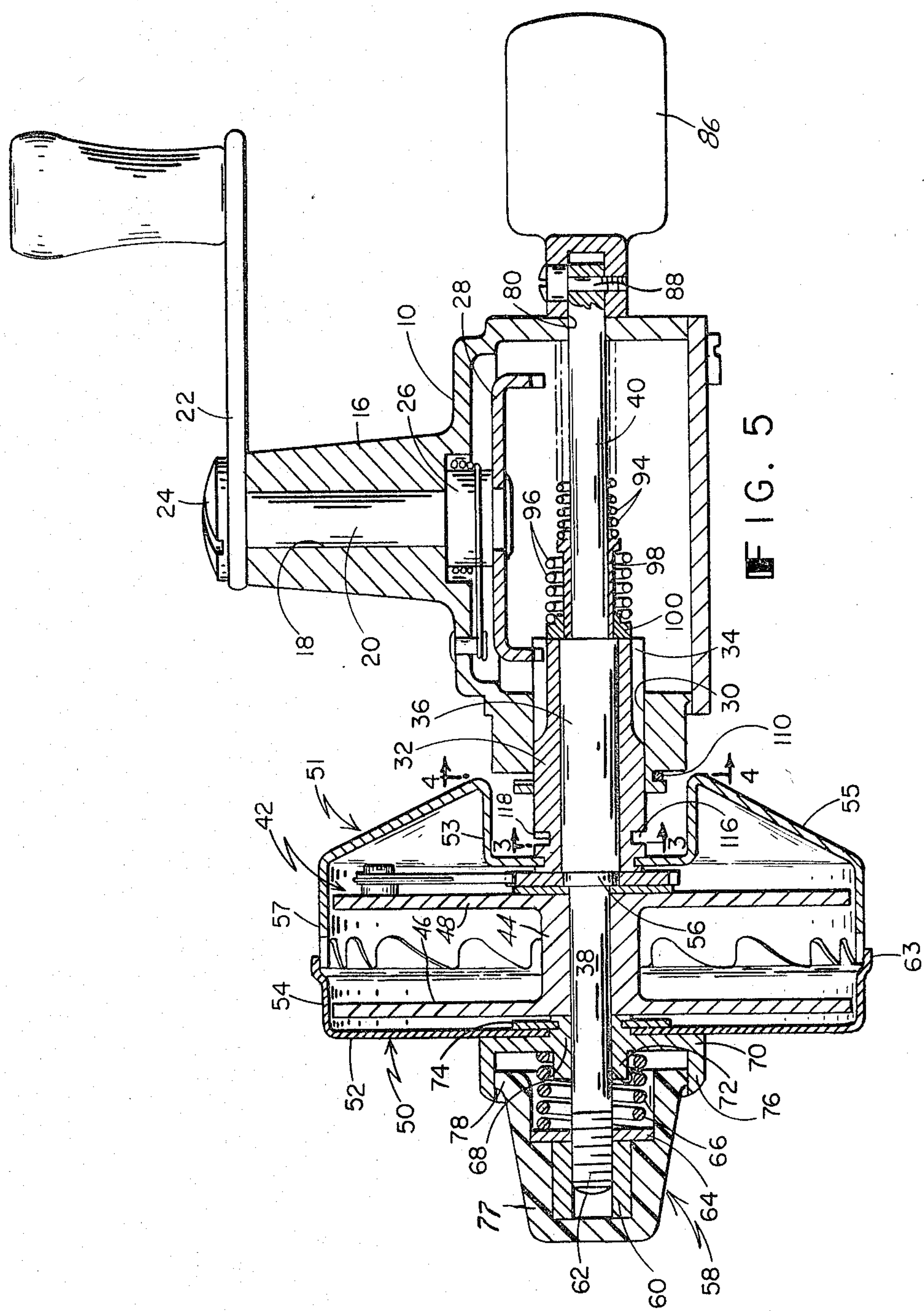
FIG. 5 is an enlarged horizontal section taken along the line 5—5 of FIG. 1.

A flyer 51 is mounted on the sleeve 32 at the rear side of the spool comprising a hub 53 secured to the sleeve, an end wall 55 and a peripheral wall 57 which is concentric with the flange 48 of the spool and extends forwardly from the end wall toward the receptacle 50 providing, when the two are engaged, an enclosure for the spool. The forward end of the flyer 57 contains a plurality of uniformly spaced notches 59 which operate, when the flyer is engaged with the receptacle, to trap the line for winding on the spool. The receptacle is rotated by frictional engagement of the flyer therewith when the two are engaged as shown in FIG. 5. The flyer, in addition to being rotatable with the sleeve, is movable rearwardly therewith.

The spindle part 40 extends rearwardly through the body and through an opening 80 at the rear side. A push lever 82 having arms 84 and 86 is mounted on the rearwardly projecting end of the spindle portion 40. The arm 84 is hollow and is secured to the spindle by a screw bolt 88 inserted through one wall of the arm 84 through a hole 90 in the spindle part 40 and threaded into the opposite wall of the arm 84. A fulcrum element 92 is formed on the rear side of the body below the level of the spindle portion 40 so as to project into the hollow arm of the lever and to have engagement with the inner side of the arm. The fulcrum element 92 provides the additional function of holding the spindle against rotation. As thus constructed, pressure applied to the arm 86 in a downward direction pivots the lever on the fulcrum 92 so as to pull the spindle rearwardly.

Rearward movement of the spindle and also of the sleeve are opposed by two coiled springs 94 and 96. The spring 94 is disposed about the spindle portion 40 with one end engaged with the inner side of the body at the rear end and the other engaged with an end of a spacer sleeve 98 mounted on the spindle part 40 adjacent its junction with the spindle part 36. The other spring 96 is supported at its ends in concentric relation to the spindle portion 40 by engagement with the inside of the rear end of the body at one end and at its other end with a bearing ring 100 which has contact with the sleeve 32. Normally the springs hold the spindle and sleeve in the positions indicated in FIGS. 1 and 5, the reactive force of the springs being taken up by engagement of the arm 84 with the outer end of the body. In the aforesaid position of the parts, the spool is completely enclosed by the receptacle and flyer and the line extends from the spool outwardly through one of the notches 59 formed peripherally of the forward edge of the flyer. The projections 61 between recesses operate, in conjunction with the rear edge of the flange 54, to guide the line into the notches and to effect its rotation about the axis of the spool for winding onto the spool. To enhance driving engagement of the projections with the flange 54, the latter has at its inner edge a peripheral enlargement 63 circumferentially large enough in diameter to receive the peripheral edge of the flyer.

Figure 2:
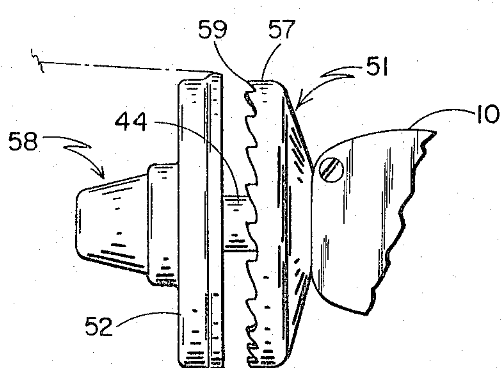
FIG. 2 is a fragmentary elevation showing the position of the component parts at the instant of casting with the line running forwardly off of the spool.
Figure 3:
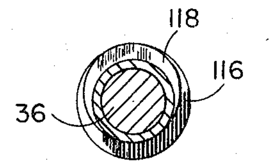
FIG. 3 is a section taken on the line 3—3 of FIG. 5.
Figure 4:
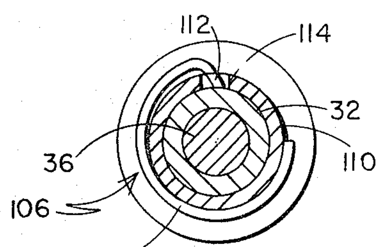
FIG. 4 is a section taken on the line 4—4 of FIG. 5.

To provide a gap between the flyer and receptacle so that the line can run off the forward end of the spool freely, a latch 108 (FIG. 4) is provided for holding the sleeve 32 and hence the flyer retracted. The latch comprises a spring steel wire 108 secured in a peripheral groove 110 formed on the end of the body 10 concentric with the sleeve 32, the spring having a hook 112 at its free end extending through an opening 114 in the bottom of the groove 110 and resting on the peripheral surface of the sleeve 32. The sleeve has near its forward end a groove 116 (FIG. 5) which is wide enough to receive the hooked end 112 of the latch wire. Consequently, by pulling the spindle 36 rearwardly to bring the groove 116 into registration with the hole 114, the hooked end 112 will snap into the groove and hold the sleeve retracted which, in turn, holds the flyer retracted. The spindle however is free to move forwardly and to carry with it the receptacle and spool so as to separate them from the flyer and to provide a space therebetween as shown in FIG. 2. In this position the line is free to travel around the peripheral surface of the receptacle and hence to run freely off the end of the spool. The latch is disengaged by means of a cam 118 at the rear side of the grove 116 by rotation of the sleeve which causes the end of the hook 112 to rise upwardly out of the groove onto the peripheral surface of the sleeve. Such rotation is effected by turning the handle 22 to commence rewinding the line.

Figure 6:
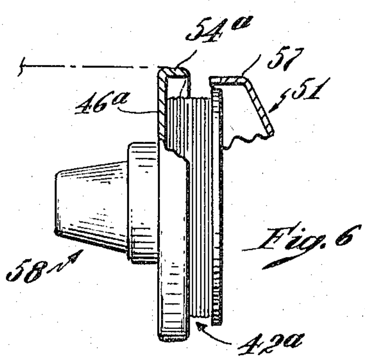
FIG. 6 is a fragmentary elevation, partly in section, showing an alternate form of the invention.

Optionally, the receptacle 50 may be omitted and a spool **42*a* provided at its forward end with an enlarged end 46*a* having a peripheral, rearwardly extending flange 54*a* may be used, as shown in FIG. 6. The end 46*a* and the flange 54*a* in this form provide the enclosure for the forward end of the spool and the flange 54*a*, in combination with the flyer, serves to hold the line on the spool or release it as described above. The spool is held stationary, as previously explained, by the cap nut assembly 58** and in this form of the invention, since the enclosure is an integral part of the spool, the latter is also held stationary.

The reel is used in the following fashion. With the reel mounted on a rod and a filled spool and with a portion of the line extending from the spool through one of the notches 59, casting is effected without manipulation of the line by the simple expedient of pressing downwardly on the arm 86 as the rod is moved rearwardly in the backswing, holding the arm 86 depressed until the rod is moved forwardly and releasing the arm 86 at the forward extremity of the cast. The depression of the arm 86 pulls the spindle rearwardly, carrying with it the receptacle, spool, sleeve and flyer and upon reaching the extremity of its rearward movement the sleeve becomes latched in position by the latching wire. Release of the arm 86 permits the spindle to move forwardly, carrying with it the receptacle and spool and leaving the sleeve and flyer in the retracted position so that the receptacle is separated from them exposing the spool for unwinding of the line therefrom about the peripheral surface of the receptacle. Having made the cast the handle 22 is rotated to effect retrieving and such rotation, by rotating the gear 28 and sleeve 32, disengages the latch so that the sleeve and flyer immediately move forwardly into engagement with the receptacle to catch the line within one of the notches 59 and simultaneously, by rotation of the flyer, to wind the line onto the spool.

To prevent turning the handle in the wrong direction a coiled spring 120 is mounted on the thrust bearing 26 and is secured at its opposite ends, respectively, to the thrust bearing and to the body to limit such rotation.

The push lever 82 shown herein may be conveniently manipulated by means of the thumb while grasping the handle of the rod during casting, so that only one hand is required for complete control. It is to be understood however that the lever may be relocated and/or redesigned to be manipulated by, for example, the index finger or it may be in the form of a button which may be depressed and then released, so long as it retains the essential features herein illustrated of being movable in one direction to cock, that is, make the parts ready for separation during the backswing and upon release during the forward swing to effect separation of the parts.

It should be understood that the present disclosure is for the purpose of illustration only and that this invention includes all modifications and equivalents which fall within the scope of the appended claims.

I claim:

1. An open-face fishing reel comprising a support, a spindle mounted on said support for axial movement, a spool non-rotatably supported on the spindle, coaxial means situated on the spindle at opposite ends of the spool including a flyer at the rear end of the spool rotatable on the spindle relative to the spool, said coaxial means being operable, by rotation of the flyer, to wind and retain the line on the spool, means for effecting rotation of the flyer, a manually operable lever operable to move the spindle rearwardly relative to its support, and a latch operative to engage and hold the flyer at said rearward position, said lever being further operative to release the spindle, and means operative on further operation of the lever to return the spindle and the spool therewith to its forward position.

2. An open-face fishing reel comprising a non-rotatably mounted spool supported with its axis disposed in the direction of casting to enable flow of the line over the forward flange of the spool, a housing supported concentrically about the spool, said housing comprising front and rear parts which collectively provide a line eye through which the line extends radially from the axis of the spool through the housing and forwardly therefrom, said eye being operable to carry the line around the spool during relative rotation of the spool and housing, said spool and housing being movable rearwardly in unison, means operative to retain the spool and rear part of the housing in said rearward position, and a push lever control operative to effect rearward movement of the spool and housing to said rearward position, said push lever being further operative to release the spool and front part of the housing in conjunction with casting to free the line from the eye, and means operative on such further movement of the push lever to restore the spool and front part to their initial position.

3. An open-face fishing reel according to claim 2, comprising means for effecting rotation of the rear part of the housing.

4. An open-face fishing reel according to claim 2, comprising means operably connected to the rear part of the housing for effecting its rotation, and interengageable means on the front and rear parts cooperative to frictionally effect rotation of the front part in unison with the rotation of the rear part.

5. An open-face fishing reel comprising a spool non-rotatably supported with its axis disposed in the direction of casting to enable flow of the line over the forward flange of the spool, a receptacle supported in concentric relation to the spool, said receptacle housing the forward end of the spool, a rotatably supported flyer at the rear end of the spool, said flyer being rotatable relative to the spool to retrieve the line by winding it onto the spool and cooperable with the receptacle to enclose the spool, means for rotating the flyer, a push lever operative to retract the receptacle, spool and flyer in unison, means operative to retain the flyer in said retracted position, said push lever being further operative, when casting, to release the receptacle and spool to permit movement thereof forwardly relative to the flyer to expose the spool, and means operative, upon said further operation of said push lever, to move the receptacle and spool forwardly.

6. An open-face fishing reel comprising a spindle, a spool non-rotatably supported on the spindle with its axis disposed in the direction of casting to enable flow of the line over the forward flange, a receptacle mounted on the spindle at the forward end of the spool and concentric thereto, a sleeve mounted on the spindle rearwardly of the spool, a flyer mounted on the sleeve and rotatable therewith to retrieve the line by winding it onto the spool, means for rotating the flyer, said receptacle and flyer, when the latter is in operative position, collectively forming a housing enclosing the spool and retaining the line on the spool, manually operable means for retracting the spindle and, in turn, retracting the receptacle, spool, sleeve and flyer as a unit, latch means at said retracted position engageable with the sleeve to hold the sleeve and flyer retracted, said manually operable means being further operable, when casting, to release the spindle, spool and receptacle, and spring means operable, by such release, to move the receptacle and spool forwardly relative to the flyer thus to expose the spool.

7. An open-face fishing reel comprising a spindle and spool non-rotatably supported on the spindle with its axis disposed in the direction of casting to enable flow of the line over the forward flange of the spool, a receptacle mounted on the spindle at the forward end of the spool, a sleeve on the spindle rearwardly of the spool, a flyer mounted on the sleeve, said sleeve and flyer being rotatable, means for effecting rotation of the sleeve and flyer and the latter, when rotated by the sleeve, effecting winding of the line on the spool and, in conjunction with the receptacle, housing the spool, said spindle and sleeve being movable in unison and relative to each other in an axial direction, means yieldingly resisting axial movement of the spindle and sleeve, a lever operable to retract the spindle, receptacle, spool, sleeve and flyer in unison, a latch operative, by engagement with the sleeve in the retracted position, to hold the sleeve retracted, said lever being further operable to release the spindle, receptacle and spool so that they move forward relative to the sleeve and flyer, and means operable, by rotation of the sleeve, to disengage the latch.

8. An open-face fishing reel comprising a body, a sleeve rotatably supported on the body for rotation about its longitudinal axis, said sleeve having a part extending into the body and a part extending from the body, said part extending into the body having on its periphery teeth, a shaft rotatably supported on the body substantially at right angles to the sleeve, said shaft having an end extending into the body and an end extending outwardly of the body, a handle secured to the outwardly extending end of the shaft, a gear fixed to the inwardly extending end of the shaft, said gear being in mesh with the teeth on the sleeve, a spindle supported in the sleeve, said spindle being axially slidable therein, a spool non-rotatably mounted on the spindle, a receptacle mounted on the spindle forwardly of the spool, said receptacle being concentric with the forward end of the spool and partially enclosing it, a flyer mounted on the sleeve at the rear end of the spool, said flyer being rotatable with the sleeve and extending forwardly over the spool and, in conjunction with the receptacle, housing the spool, a lever at the rear end of the spindle operably connected thereto and operable to retract the spindle, said receptacle, spool, sleeve and flyer being movable therewith, a latch on the body operable, when the sleeve is retracted, to engage the sleeve and prevent its forward movement, said lever being further operable, following retraction, to permit the spindle to move forwardly carrying the receptacle and spool therewith and leaving the sleeve and flyer retracted, and means operable, by rotation of the handle, to disengage the latch.

9. An open-face fishing reel comprising a non-rotatably mounted spool supported with its axis disposed in the direction of casting to enable flow of the line over the forward end of the spool, and a spindle supporting the spool, front and rear end flanges at the ends of the spool, an annular part peripherally of the front flange extending rearwardly thereof in concentric relation to the axis of the spool, a rotatably supported flyer at the rear end of the spool, means for effecting rotation of the flyer, said flyer being rotatable relative to the spool and cooperable with the annular part at the front end of the spool to wind the line on the spool and retain it, a push lever operable to move the spindle together with the spool and flyer rearwardly, means operative, at the rearward position of the spindle engageable with the flyer, to retain it in said rearward position, said push lever being further operative, when casting, to permit the spindle and spool to move forwardly relative to the flyer, and means operative, upon such further movement of the push lever, to effect forward movement of the spindle to separate the spool from the flyer.

References Cited by the Examiner

UNITED STATES PATENTS

| | | | |
|---|---|---|---|
| 2,507,457 | 5/1950 | Rix | 242—84.2 |
| 2,602,603 | 7/1952 | Blissit | 242—84.2 |
| 2,652,990 | 9/1953 | Ferguson | 242—84.2 |
| 3,116,893 | 1/1964 | Wood | 242—84.2 |

FOREIGN PATENTS

| | | |
|---|---|---|
| 1,110,429 | 10/1955 | France. |

STANLEY N. GILREATH, *Primary Examiner.*

FRANK J. COHEN, *Examiner.*

J. PETRAKES, *Assistant Examiner.*